United States Patent

[11] 3,577,861

| [72] | Inventors | David L. Bender<br>Rochester;<br>Robert E. Moore, Henrietta, N.Y. |
|---|---|---|
| [21] | Appl. No. | 822,816 |
| [22] | Filed | Apr. 7, 1969 |
| [45] | Patented | May 11, 1971 |
| [73] | Assignee | Kayex Corporation<br>Rochester, N.Y. |

[54] TRANSFER DEVICE FOR CUTTING APPARATUS
15 Claims, 9 Drawing Figs.

[52] U.S. Cl. .................................................... 51/73
[51] Int. Cl. ................................................... B24b 7/20
[50] Field of Search ...................................... 51/73; 125/15

[56] References Cited
UNITED STATES PATENTS
3,039,235  6/1962  Heinrich ........................ 51/73

Primary Examiner—Othell M. Simpson
Attorney—Lloyd F. Seebach

ABSTRACT: A device for retrieving a thin slice or wafer of material that has been cut from a billet and for transferring it to a storage receptacle comprises two pivotal members. A first pivotal member retrieves the slice after cutting and moves it along one side of an annular cutting member into a transfer position relative to the inner diameter of the annular member. A second pivotal member takes the slice at the transfer position and moves it axially and then in an arcuate path to a storage receptacle where it is released. The slice of material is retained on the pivotal members by suction. Suitable circuitry controls the application of the suction in proper timed relation to the movement of the pivotal members. A movable support member for the billet is also pivotally mounted so it can move the billet into a position in which it is spaced from the annular member on movement of the latter to its home position, thereby preventing damage to its exposed surface by contact with the annular member. In its home position the billet is moved axially to establish the thickness of the slice to be cut next and then radially relative to the annular member in another cycle of operation to cut the slice. Movement of the support member is also controlled by circuitry interconnected with that for controlling movement of the pivotal members.

DAVID L. BENDER
ROBERT E. MOORE
INVENTORS

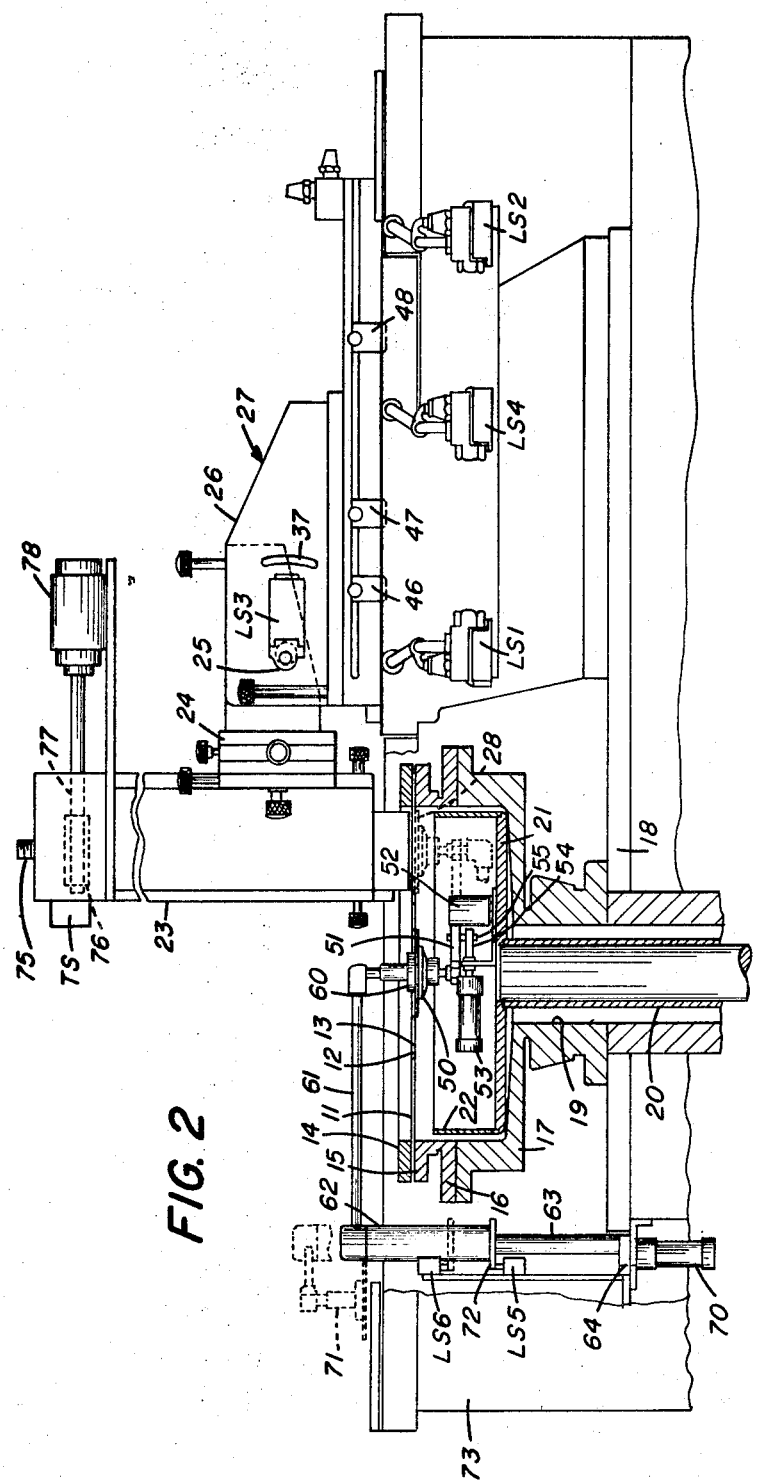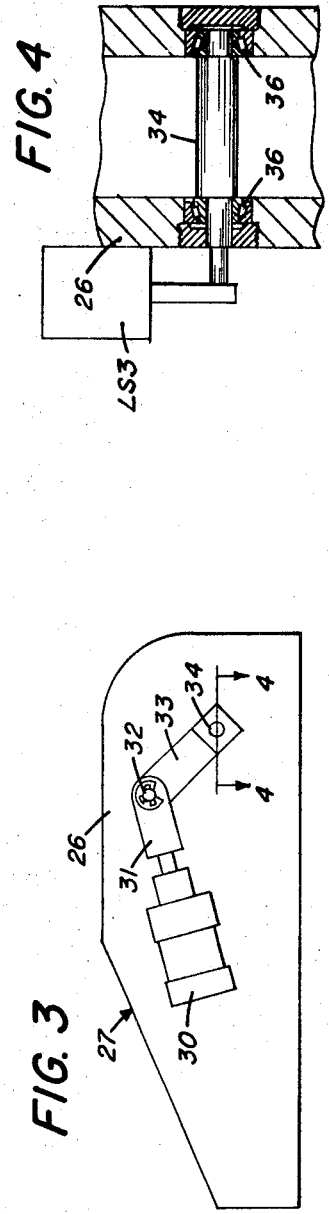

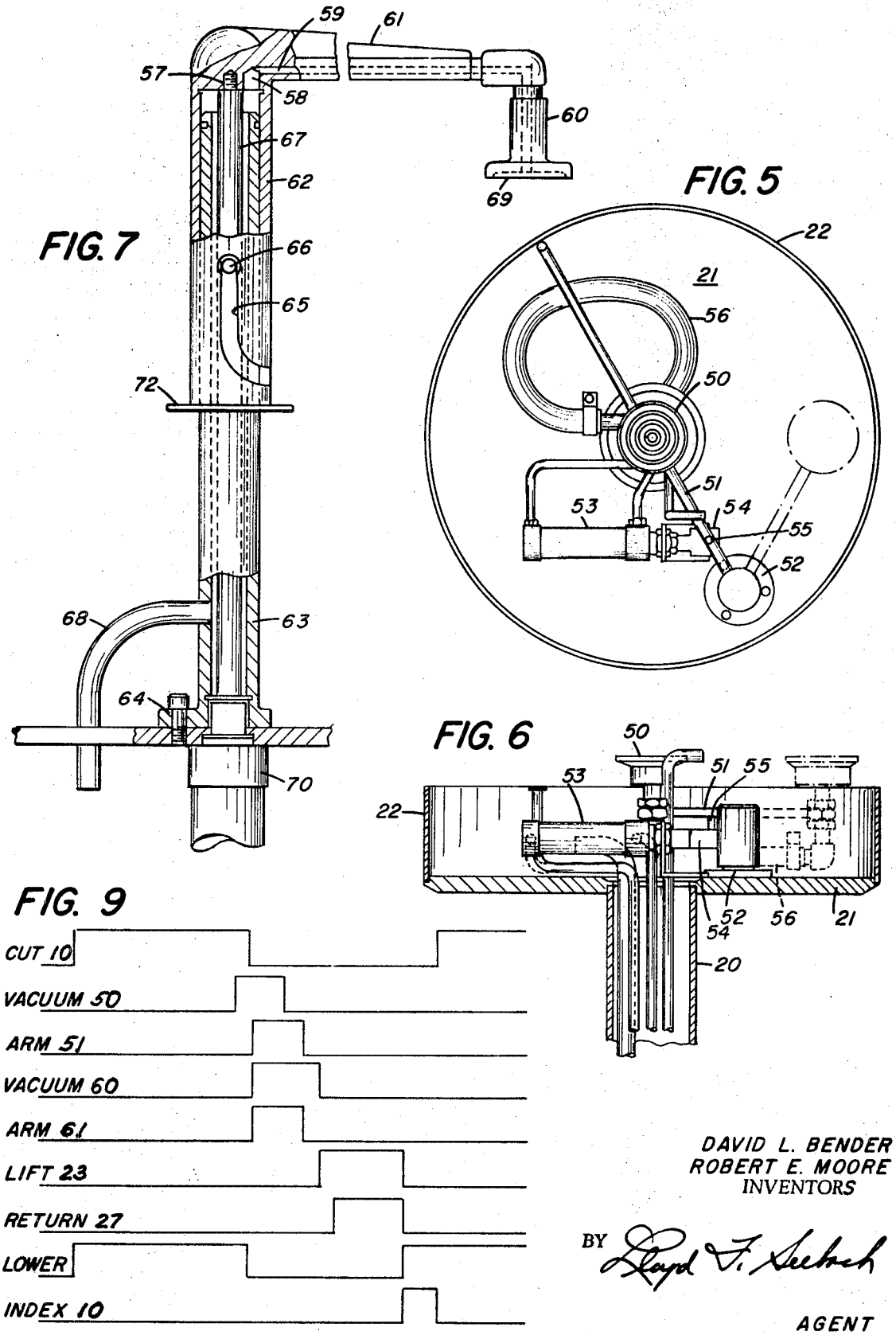

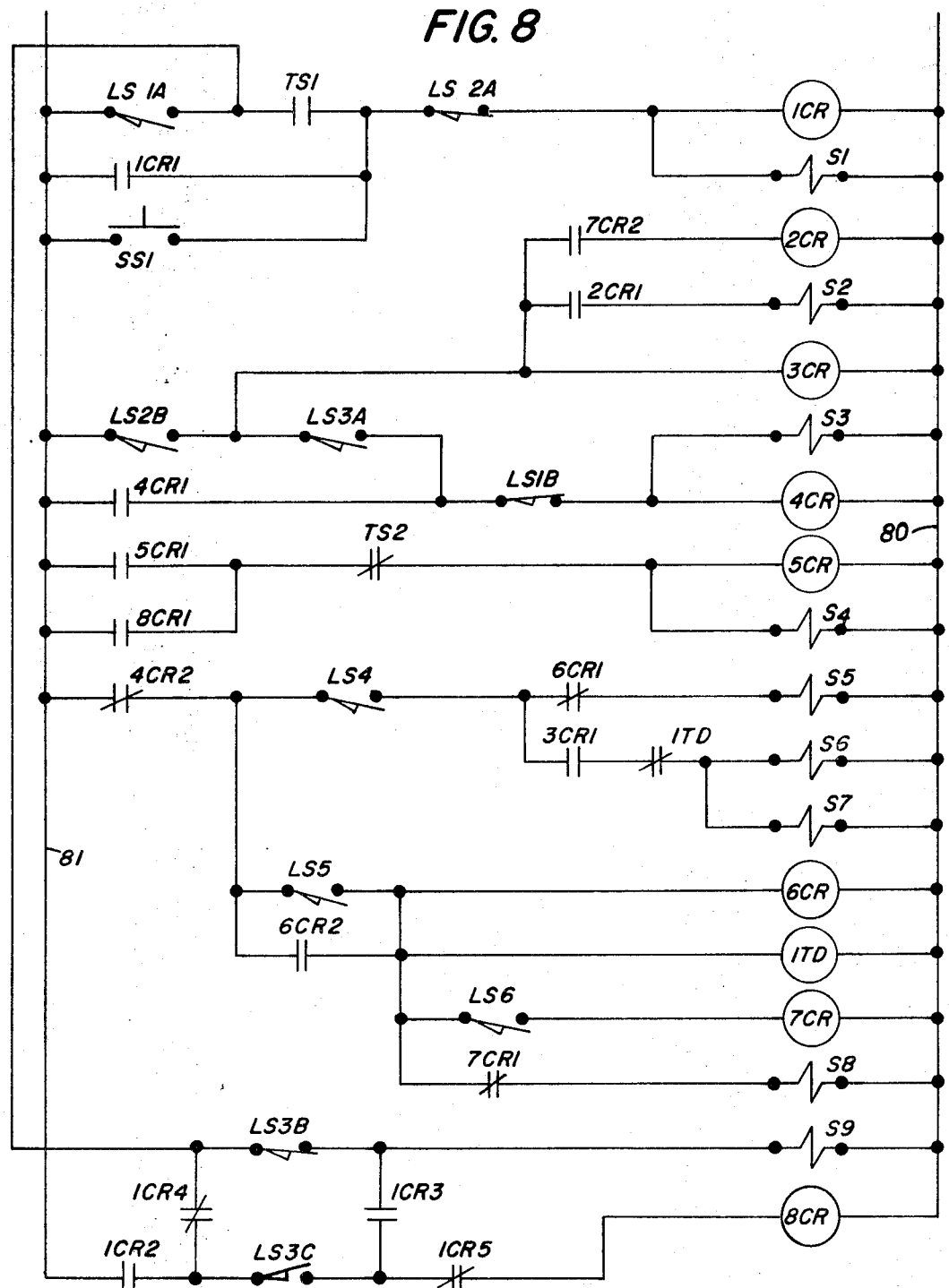

3,577,861

TRANSFER DEVICE FOR CUTTING APPARATUS

FIELD OF THE INVENTION

The invention relates to a cutting device and, more particularly, to retrieval and movement of a thin slice of material by a system of transport members that are interrelated in their movements so as to move the slice as well as the billet from which the slice has been cut between several spaced stations in a repetitive and automatic cycle of operation.

DESCRIPTION OF THE PRIOR ART

The present invention is concerned with a cutting device which permits the thickness of a slice of material such as a crystal, to be of exact dimension as to thickness with smooth and parallel surfaces. The crystal can be of various types, such as silicone and germanium, which are used to make transistors and rectifiers as used in the field of electronics. The invention is directed primarily to cutting apparatus of the type disclosed and described in U.S. Pat. No. 3,039,235. In such apparatus, it was found that the slices of crystal material could not be satisfactorily accumulated in a receptacle directly below the annular cutting member. Although the distance through which the slice of crystal material fell, after being cut, was very small, the distance was still sufficient to cause cracking and breaking of the slices. Also, it was found that as the billet was returned from a position in which the slice of material had been completely severed, to its original position relative to the inner diameter of the annular cutting member, the facing surface of the billet was scratched by the cutting surface of the annular member. As a result, each slice of crystal material had a smooth surface and a surface that was somewhat scratched by the annular cutting member. Accordingly, it was necessary to devise a system whereby the slice of crystal material could be retrieved without breakage and the billet could be moved in such a way that its facing surface would not be subjected to any scratching by the annular member.

SUMMARY OF THE INVENTION

The primary object of the invention is to provide a device for retrieving and moving a thin slice of crystal material and for moving a crystal billet such that the exposed face thereof is not subjected to damage by an annular cutting member.

Another object of the invention is to provide a device in which a billet is movable relative to an annular cutting member so that its facing surface is displaced from the annular member during movement of the billet into a home position in which it can also be indexed.

Still another object of the invention is to provide a mechanism by which a slice of thin, crystal material can be retrieved from one side of an annular cutting member and moved to the other side thereof for transfer to a storage receptacle in timed relation to the cutting thereof and the cutting of the next slice.

A further object of the invention is to provide a device for moving a crystal billet relative to an annular cutting member and for moving a slice cut from the billet member into a storage receptacle in which the transport mechanisms are interrelated so as to provide a completely automatic and repetitive cycle of operation.

These and other objects and advantages will be apparent to those skilled in the art by the following description of a preferred embodiment of the invention.

The above objects of the invention are attained by providing a support member for a crystal billet that is pivotally mounted with respect to a slide member so that the billet can be moved into a position in which the surface thereof facing an annular cutting member clears the latter by a distance sufficient to permit the billet to be moved relative thereto without scratching the facing surface. Also, a mechanism comprising two pivotally mounted members provides for transferring a slice of crystal material that has been cut from the billet to a transfer position in which the slice is aligned with the inner diameter of the annular member and for transferring the slice to the other side of the annular member so it can be deposited in a storage receptacle. The actuation of the support member and the pivotal members is controlled by a circuitry including a plurality of limit switches that are actuated by respective members in a timed relation so as to provide a repetitive cycle of operation. In such a cycle of operation, the billet is moved in a radial direction from a position within the inner diameter of the annular member until a slice of the crystal material has been cut therefrom. In this second position, one of the pivotal members retrieves the slice and moves it toward a transfer position that is generally aligned with the inner diameter of the annular member. In this transfer position, the slice is transferred to a second pivotal member which then moves axially and on the other side of the annular member moves the slice toward a storage receptacle in which it is deposited. At this time, the support member for the billet is moved into a position such that the billet clears the annular member. The billet is then moved in a reverse direction toward the inner diameter of the annular member. When in its proper position relative to the annular member, the support member for the billet is returned to its normal cutting position and the billet is then indexed in a vertical direction by an amount corresponding to the thickness of the slice that is next to be cut. Another cycle of operation is then initiated.

DESCRIPTION OF THE DRAWING

Reference is now made to the accompanying drawings wherein like reference numerals designate like parts and wherein:

FIG. 2 is a side elevational view partially in section of the apparatus shown in FIG. 1;

FIG. 3 is a detail side elevational view showing the mechanism for moving the billet support member;

FIG. 4 is a partial sectional view taken generally along line 4—4 in FIG. 3;

FIG. 5 is a detail plan view of one mechanism for transferring a slice of material;

FIG. 6 is a side elevational view of the mechanism shown in FIG. 5;

FIG. 7 is an enlarged front elevational view of the other mechanism for transferring a slice of material;

FIG. 8 is a schematic wiring diagram for initiating and controlling a cycle of operation in accordance with the invention; and FIG. 9 is a schematic timing diagram.

DESCRIPTION OF THE PREFERRED EMBODIMENT

Figure 1:
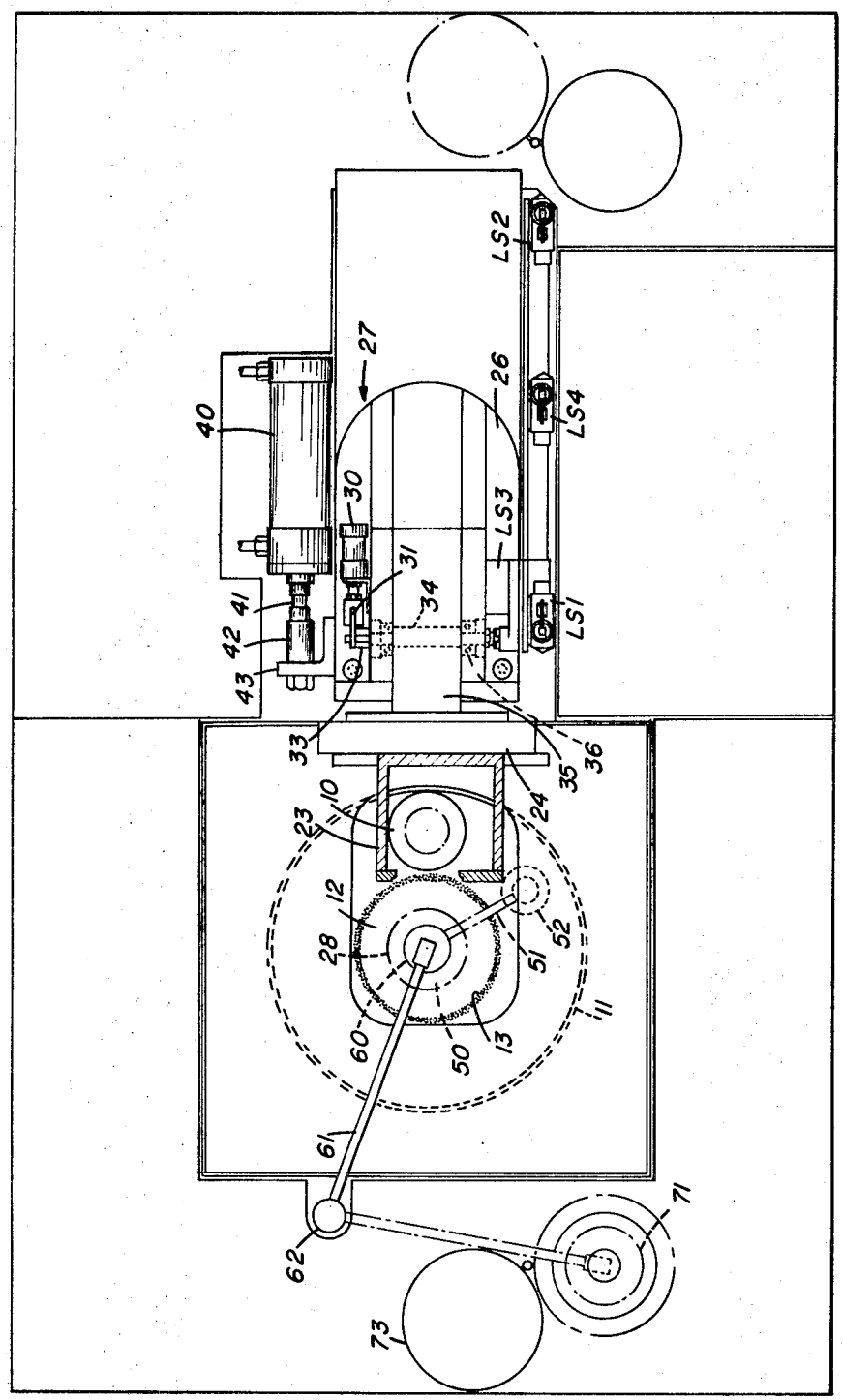
FIG. 1 is a plan view of the cutting apparatus showing the relationship of the support means for the crystal billet and the pivotal members for effecting retrieval and transfer of the billet.

Inasmuch as the present invention is incorporated in the cutting apparatus disclosed in the above-mentioned U.S. Pat., namely, No. 3,039,235, a detailed description of the manner in which the crystal billet 10 is mounted in such apparatus will not be described in detail. For a complete description of the billet-mounting structure, reference can be made to the aforementioned patent.

An annular member 11 has a circular opening 12, the edge of which is covered with a diamond grit in a well-known manner to provide a cutting edge 13. The annular member 11 is mounted between a pair of rings 14 and 15 and radially tensioned by a ring 16, the latter being fixed to a cup-shaped member 17 which is rotatable and driven by any suitable means (not shown) connected thereto. The member 17 is mounted on plate 18 and has an axial opening 19 through which a sleeve 20 extends for supporting a plate 21 and a ring 22 which form a receptacle within member 17.

The billet 10 is mounted in a pedestal 23 that is mounted on a bracket 24 which is pivotally mounted at 25 with respect to a movable slide 26, these members comprising, in effect, a support member for the billet generally designated by the numeral 27. The support member 27 is movable in a direction such that the billet 10 is moved radially with respect to annular member 11. The support member 27 is moved by a hydraulic cylinder 40 interconnected to slide 26 as described hereinbelow.

From the description thus far, the means for supporting the billet 10 with respect to the annular cutting member 11 comprises the pedestal 23, the bracket 24 and the slide 26 with the bracket pivotally mounted on the latter as described above. As a result, billet 10 is moved between a first position in which it is generally aligned with the opening 12 in annular member 11 and a second position in which it is arranged relative to one surface of the annular member 11 as shown in FIGS. 1 and 2, the movement being radially with respect to annular member 11 so as to cut a slice of predetermined thickness from the billet. In FIG. 1, the first position is indicated by the dotted line 28.

As the support member 27 moves the billet 10 from its first position to its second position a group of limit switches LS1, LS4 and LS2 are actuated, respectively, as described in more detail hereinafter in connection with a cycle of operation by adjustable lugs 46, 47 and 48 which are mounted on slide 26, see FIG. 2. These limit switches comprise part of the control means for initiating and controlling the sequential operation of the various elements comprising the device in a cycle of operation.

As shown in FIGS. 1, 3 and 4, a hydraulically operated member 30 is mounted on slide 26 and has an actuating member 31 that is pivotally connected at 32 to an arm 33 fixed to shaft 34. The portion of shaft 34 that passes through the extension 35 of bracket 24 is eccentric with respect to the bearing portions 36 mounted in slide 26. When shaft 34 is rotated a small amount by member 30 through arm 33, the pedestal 23 is tilted so as to raise the surface of billet 10 away from the surface of annular member 11. A pin and slot arrangement 37 limits the movement of pedestal 23 and bracket 24 relative to slide 26 for loading a billet or for removing the short end from which no further slices can be cut.

The means for moving billet 10 and support member 27 relative to annular member 11 so as to cut a slice therefrom comprises a hydraulically actuated member designated by the numeral 40 which has the end 41 of an operating member (piston, not shown) coupled at 42 to a bracket 43 that is attached to slide 26. The slide 26 is mounted for linear movement by means of a slide and gib arrangement in a well-known manner.

With particular reference to FIGS. 2, 5 and 6, a suction plate 50 is mounted on an arm 51 which is pivotally mounted on plate 21 at 52. A hydraulically actuated member 53 has the end 54 of its operating member (piston, not shown) pivotally connected to arm 51 at 55. The plate 50 is connected in a suitable manner via line 56 to a vacuum source (not shown) the vacuum being applied to plate 50 in timed relation to movement of billet 10 from its first position to its second position as described hereinafter. The plate 50 is normally arranged relative to the second position of the billet 10. In order words, plate 50 is initially in relation to the position of the billet 10 in which the slice will be cut therefrom so that it can be readily retrieved and held on plate 50. Upon actuation of member 53, the plate 50 is moved by arm 51 and member 53 into a position generally aligned with the axis of annular member 11. In this position (transfer position), the slice is transferred from plate 50 to a suction member 60.

As shown in FIGS. 2 and 7, the suction member 60 extends vertically downward from an arm 61 that is formed or made integral with a vertical sleeve 62. Sleeve 62 is mounted on a vertically extending sleeve 63 that is secured by flange 64 to plate 18 in any well-known manner. Sleeve 62 is provided with a slot 65 of the shape best shown in FIG. 7 and this slot engages a pin 66 carried by sleeve 63. A rod 67 extends vertically upward within sleeve 63 and threadably engages sleeve 62 at 57, the space between the rod and the inner diameter of sleeve 63 being connected to a vacuum source by means of a line 68, as shown in FIG. 7. By means of suitable apertures 58 and 59 in sleeve 62 and arm 61, respectively, the vacuum source or suction is connected to member 60 so that the slice can be retained thereon at the face 69. Vertical movement of member 60, arm 61 and sleeve 62 is accomplished by vertical movement of the rod 67 which is interconnected to the operating member of a hydraulic cylinder 70. As the sleeve 62 is moved axially the pin and slot connection 65 and 66 causes the member 60 to be raised relative to the plane of cutting member 11 and moved from a position generally aligned with plate 50 into a position designated by dotted line 71 in FIG. 1 in which the slice is released from member 60 in proper timed relation.

As shown in FIGS. 2 and 7, sleeve 62 is provided with a collar 72 which upon movement of sleeve 62 into its extreme positions operates either limit switch LS5 or LS6, as described hereinafter. These switches comprise a part of the control means for initiating movement of the various parts during a cycle of operation.

The billet 10 is indexed relative to annular member 11 by a lead screw 75 which is rotated by means of a fixed nut 76 which, in turn, is rotated by a rack 77 which meshes with the gear teeth on the peripheral surface of nut 76, the teeth not being shown. The rack 77 is actuated by the operating member of hydraulic cylinder 78. The linear movement of the operating member can be adjusted to provide a movement of billet 10 which will locate it relative to annular member 11 so as to permit a slice of the desired thickness to be cut. The nut 76 and its gear teeth are, in effect, separated but, nevertheless, joined by a one-way clutch not shown. The clutch is necessary to permit rack 77 to be returned to its normal position after the billet has been advanced.

From the description thus far, it can be readily appreciated that plate 50 with the operating mechanism therefor comprises means movable relative to the other surface of the annular member 11 such that the slice that has been cut from billet 10 is moved from a retrieval position to a position in which the slice is released therefrom for transfer to suction member 60. Also, the mechanism for actuating suction member 60 comprises means movable between the transfer position (dotted line 28, FIG. 1) and a position in which the slice is released from suction member 60 (dotted line 71, FIG. 1) to deposit the slice in a receptacle 73. Further, the suction member 60 is also moved in a vertical direction in order to move the slice that has been cut away from the annular member 11. This latter movement of the slice is accomplished during a portion of the operating cycle in which billet 10 is being returned to its first position or relative to the inside diameter of annular member 11 in which position the billet is indexed relative to the annular member for making the next cut to produce another slice of material. While the mechanisms have been described in detail, the manner in which the various elements operate in an interconnected manner to provide a complete cycle of operation can be best described in connection with the schematic wiring diagram shown in FIG. 8.

A CYCLE OF OPERATION

At the start of a cycle of operation, the billet 10 is generally aligned with the inner diameter 12 of the annular member 11, the head 50 is aligned with the second position assumed by billet 10 and the member 60 is in its release position relative to receptacle 73 as indicated by dotted line 71 in FIG. 1. It should also be understood that various elements are moved, actuated or operated by hydraulically operated members, particularly members 53 and 70 which actuate the members for transferring the slice. These hydraulic members are controlled by solenoid valves which when energized cause operation of the movable part in one direction and when deenergized automatically cause a reversal of operation such that the movable part is moved in the other direction and into its normal position. In the schematic wiring diagram, see FIG. 8, the solenoid-operated valves for controlling such hydraulic members are designated as S1—S9 and the relays for actuating their various contacts so as to provide a cycle of operation are designated as 1CR—8CR.

At the start of a cycle, the switch LS1 has been actuated by lug 46 because support member 27 with billet 10 is in the "home" position so that contact LS1A is held closed and contact LS1B is held open. The start switch SS1 is closed momentarily and a circuit is completed across the lines 80—81 through LS2A to energize solenoid S1 and relay 1CR. With the energization of relay 1CR, its contacts 1CR1, 1CR2 and 1CR3 are then closed and contacts 1CR4 and 1CR5 are opened, the latter contacts holding out relay 8CR. Contact 1CR1 holds in both solenoid S1 and relay 1CR upon release of SS1. Also, with the closure of contacts 1CR2 and 1CR3, the solenoid S9 is energized through the closed contact LS3C of switch LS3. Solenoid S9 exerts a force against billet 10 during cutting to maintain it in position relative to annular member 11 thereby preventing any chatter. Solenoid S1 controls the actuating cylinder 40 for moving the support member 27 (pedestal 23, bracket 24 and slide 26) to the right as seen in FIGS. 1 and 2 and radially with respect to annular member 11. By this movement, billet 10 is moved from within the inner diameter of annular member 11 against cutting edge 12 and toward a position in which it will be generally aligned with suction head 50. With the release of switch LS1 by lug 46 its contact LS1A opens and its contact LS1B closes.

As support member 27 nears the end of its travel to the right, switch LS4 is actuated to a closed position by lug 47 and solenoid S5 is energized via closed contacts 4CR2 and 6CR1, switch LS4 being held closed until the cut slice is transferred as described hereinafter. The solenoid S5 controls application of a vacuum source to the suction plate 50. The suction is applied to plate 50 just prior to the end of the cutting stroke in order to condition the plate for receiving the slice that is being cut from billet 10. At the end of the cutting stroke, lug 48 on support member 27 actuates switch LS2 thereby opening its contact LS2A and closing its contact LS2B. The opening of contact LS2A cuts out relay 1CR and solenoid S1, thereby inactivating the hydraulic member 40 and terminating the cutting stroke. Closure of contact LS2B energizes relay 3CR thereby closing its contact 3CR1, whereby solenoids S6 and S7 are energized through contact 4CR2, switch LS4 and contact 1TD. Solenoid S6 controls operation of the hydraulic member 53 for moving the plate 50 with the cut slice thereon into the transfer position relative to the inner diameter of annular member 11. In the same way, solenoid S7 controls operation of hydraulic member 70 for moving member 60 from its home, or release position into the transfer position in which it is aligned with plate 50. As arm 61 moves toward the transfer position, its movement is in an arcuate path and then downward to effect transfer of the slice on plate 50. When arm 61 starts its downward movement, switch LS6 which was held closed by collar 72 now opens. As arm 61 approaches plate 50 switch LS5 is closed by collar 72, thereby energizing relay 6CR, relay 1TD and solenoid S8, the latter controlling application of the vacuum source to member 60. With energization of relay 6CR, its contact 6CR1 opens, thereby cutting off the vacuum source from plate 50 so that transfer of the slice to member 60 is effected. Also, the contact 6CR2 is closed to maintain the circuit after LS5 opens. Relay 1TD has a built-in time delay so that it will automatically deenergize after such delay. In this case the delay is sufficient to insure transfer of the slice from plate 50 to member 60. When 1TD deenergizes, its contact 1TD1 opens and solenoids S6 and S7 are deenergized. The arms 51 and 61 are then reversed in their movement. As arm 61 moves upward, LS5 opens but the circuit is held by 6CR1.

When arm 61 swings into its home position over receptacle 73, switch LS6 is closed and relay 7CR is energized, thereby opening its contact 7CR1 so that solenoid S8 is deenergized and the vacuum is removed from member 60 so the slice can be deposited in receptacle 73 and closing contact 7CR2 so that relay 2CR is energized. Contact 2CR1 is then closed to energized solenoid S2 which controls movement of the billet 10 relative to annular member 11. The energization of solenoid S2 causes hydraulic member 30 to operate thereby moving member 31 and arm 33, see FIG. 3, so that shaft 34 is rotated. Since shaft 34 is eccentric with respect to the bearing portions 36, the eccentricity is used to actuate switch LS3. As just described, the tilting of billet 10 and its pedestal 23 takes place with the movement of arm 61 and member 60 into the home position.

When switch LS3 is actuated its contacts LS3A close, LS3B closes and LS3C opens. Relay 3CR is energized via LS2B, LS3A and LS1B as well as solenoid S3 and relay 4CR. Solenoid S3 controls hydraulic member 40 for moving support member 27 in a reverse direction (to the left as seen in FIGS. 1 and 2). As a result, switch LS2 is disengaged by lug 48 and its contacts LS2A close and LS2B opens. However, when relay 4CR was energized its contacts 4CR1 were closed thereby maintaining solenoid S3 and relay 4CR energized so billet 10 is held in a tilt position as it is moved to the left and contacts 4CR2 were opened thereby cutting out the circuits controlling movement of the arms 51 and 61 as well as the vacuum to member 60.

As support member 27 moves to the left switch LS4 is also disengaged by its lug 47 and returns to an open position. In the first position, that is when billet 10 is again generally aligned with annular member 11, lug 46 engages switch LS1 closing its contacts LS1A and opening its contacts LS1B. The opening of LS1B deenergizes solenoid S3 and relay 4CR, the solenoid S3 causing billet 10 to return to its normal position. As a result, switch LS3 is actuated with its contacts LS3A opening, contacts LS3B opening and contacts LS3C closing. Under this condition, relay 8CR is energized via 1CR5, LS3C, 1CR4 and LS1A. Relay 8CR closes its contacts 8CR1 to energize solenoid S4 and relay 5CR, the latter closing its contacts 5CR1 to maintain relay 5CR and solenoid S4. Solenoid S4 operates hydraulic member 78 which moves rack 77 to the left (as seen in FIG. 1) and through nut 76 and lead screw 75 advances the billet 10 relative to annular member 11 to establish the thickness of the slice to next be cut.

At the end of travel of rack 77 to the left, it actuates a switch TS which is adjustable relative to rack 77 to set or establish the thickness of the slice. When switch TS is actuated, its contact TS1 closes and TS2 is opened. When TS1 closes, relay 1CR is energized because LS1A is held closed by lug 46 with support member 27 in the first position and LS2A is closed. As a result, a new cycle starts without actuating start switch SS1. When contact TS2 opens, relay 5CR and solenoid S4 are deenergized and rack 77 is moved in the opposite direction. Switch TS then returns to its normal position but relay 1CR is now held in by its contacts 1CR1. The solenoid S9 is now energized via 1CR3, LS3C, 1CR4 and LS1A to apply pressure to billet 10 during the cutting stroke and is held in after LS1A opens via 1CR3, LS3C and 1CR2 until relay 1CR is deenergized.

The invention has been described in detail with particular reference to preferred embodiments thereof, but is will be understood that variations and modifications can be effected within the spirit and scope of the invention.

We claim:

1. In a device having a flat, rotatable annular member provided with an edge at the inner periphery thereof for cutting a thin slice from an element movable between a first position in which said element is within the inner diameter of said annular member and a second position in which said element is arranged in relation to one surface of said annular member between said inner diameter and the outer periphery of said annular member, the combination comprising:

means for supporting said element relative to said annular member comprising a support member pivotally mounted on a movable slide member, said support member being movable between a cutting position and a resetting position;

means coupled to said supporting means for moving the latter so said element is moved between said first and second positions;

means coupled to said support member for moving the latter and said element between said cutting and resetting positions; and control means responsive to movement of said supporting means into said second position for reversing the direction of movement of said moving means for said support means and for actuating said moving means for said support member whereby said element is moved into and retained in said resetting position for movement thereof between said second position and said first position.

2. A device in accordance with claim 1 including first means movable relative to the other surface of said annular member and between a retrieval position generally aligned with said second position and a transfer position, said thin slice being retrieved by said first means, when cut and released from said element when the latter is in said second position, for movement to said transfer position which is spaced from said retrieval position; and second means movable between said transfer position and a release position, said second means receiving said thin slice from said first means, when the latter is in said transfer position, for movement to said release position in which said thin slice is discharged.

3. A device in accordance with claim 2 wherein said control means initiates movement of said first means in timed relation to movement of said element into said second position and of said second means in time relation to movement of said first means into said transfer position.

4. A device in accordance with claim 1 including means actuated by said control means for indexing said element, upon movement of said supporting means from said second position to said first position and of said element from said resetting position into said cutting position, to establish the relation of said element to said annular member, thereby determining the thickness of that slice to be cut when said element is next moved from said first position to said second position.

5. A device in accordance with claim 4 including means responsive to said supporting means, upon movement of said elements into said first position, for moving said support member into said cutting position, whereby said element is positioned relative to said annular member for establishing the thickness of the slice next to be cut.

6. A device in accordance with claim 2 wherein said control means initiates movement of said supporting means from said second position to said first position upon movement of said second means into said release position.

7. A device in accordance with claim 2 wherein said control means initiates movement of said first means and said second means, said first means moving from said retrieval position to said transfer position and said second means moving from said release position to said transfer position, and means for effecting transfer of said thin slice from said first means to said second means when in said transfer position.

8. In a device having a flat, rotatable annular member provided with an edge at the inner periphery thereof for cutting a thin slice from an element movable between a first position in which said element is generally within the inner diameter of said annular member and a second position in which said element is arranged in relation to one surface of said annular member between said inner diameter and the outer periphery of said annular member, the combination comprising:

first means movable relative to the other surface of said annular member and between a retrieval position generally aligned with said second position and a transfer position, said thin slice being retrieved by said first means, when cut and released from said element when the latter is in said second position, for movement to said transfer position which is spaced from said retrieval position; and second means movable between said transfer position and a release position, said second means retrieving said thin slice from said first means, when the latter is in said transfer position, for moving said thin slice to said release position in which said thin slice is discharged.

9. The device in accordance with claim 8 including means responsive to said first means and said second means in their respective positions for controlling the engagement and transfer of said thin slice by and between said first means and said second means.

10. The device in accordance with claim 8 including means connectable to said first means for maintaining said thin slice in engagement with said first means during movement of the latter from said retrieval position to said transfer position and to said second means for maintaining said thin slice in engagement with said second means during movement of the latter from said transfer position to said release position.

11. The device in accordance with claim 8 wherein said first means comprises a pivotally mounted arm arranged relative to the other surface of said annular member and having a free end, normally located relative to said retrieval position, for engaging said thin slice cut and released from said element, and means coupled to said arm for moving the latter whereby said thin slice is moved from said retrieval position to said transfer position.

12. The device in accordance with claim 11 including suction means coupled to said free end and activated in response to movement of said element into said second position for drawing said thin slice to said free end and holding it thereon during movement of said arm from said retrieval position to said transfer position.

13. The device in accordance with claim 8 wherein said second means comprises a pivotally mounted member having a free end portion arranged to be generally aligned with the free end of said arm, when both said arm and said member are in said transfer position, to effect transfer of said thin slice from said free end to said free end portion, and means connectable to said member for moving the latter from said transfer position to said release position in which said thin slice is discharged.

14. The device in accordance with claim 13 including suction means connected to said free end portion and activated in response to movement of said first means into said transfer position for effecting transfer of said thin slice from said first means to said free end portion and for holding said thin slice thereon during movement of said pivotally mounted member from said transfer position to said release position.

15. The device in accordance with claim 13 wherein said moving means includes cam means for moving said pivotally mounted member in an axial direction relative to said first means, when the latter is in said transfer position and before said pivotally mounted member is moved toward said release position.